(12) United States Patent
Müller et al.

(10) Patent No.: US 11,521,006 B2
(45) Date of Patent: Dec. 6, 2022

(54) CODE READER AND METHOD FOR READING OPTICAL CODES

(71) Applicant: SICK AG, Waldkirch (DE)

(72) Inventors: Romain Müller, Waldkirch (DE); Florian Schneider, Waldkirch (DE); Richard Nopper, Waldkirch (DE)

(73) Assignee: SICK AG, Waldkirch (DE)

( * ) Notice: Subject to any disclaimer, the term of this patent is extended or adjusted under 35 U.S.C. 154(b) by 134 days.

(21) Appl. No.: 17/097,401

(22) Filed: Nov. 13, 2020

(65) Prior Publication Data

US 2021/0150172 A1    May 20, 2021

(30) Foreign Application Priority Data

Nov. 15, 2019 (DE) .......................... 102019130865.8

(51) Int. Cl.
| | |
|---|---|
| *G06K 7/14* | (2006.01) |
| *G06N 3/04* | (2006.01) |
| *G06V 10/22* | (2022.01) |
| *G06V 30/10* | (2022.01) |

(52) U.S. Cl.
CPC ......... *G06K 7/1478* (2013.01); *G06K 7/1447* (2013.01); *G06N 3/04* (2013.01); *G06V 10/22* (2022.01); *G06V 30/10* (2022.01)

(58) Field of Classification Search
None
See application file for complete search history.

(56) References Cited

U.S. PATENT DOCUMENTS

| 7,570,282 B1 * | 8/2009 | Kaplinsky .............. H04N 17/02 382/167 |
| 2004/0196514 A1 | 10/2004 | Tanimoto et al. |
| 2010/0316291 A1 | 12/2010 | Deng et al. |
| 2012/0002066 A1 | 1/2012 | Wang |

FOREIGN PATENT DOCUMENTS

| DE | 102015116568 A1 | 3/2017 | |
| EP | 2261837 A2 | 12/2010 | |
| EP | 3012778 A2 | 4/2016 | |
| EP | 3383026 A1 * | 10/2018 | ........... G02B 3/0037 |
| EP | 3383026 A1 | 10/2018 | |

OTHER PUBLICATIONS

German Office Action dated Sep. 21, 2020 corresponding to application No. 102019130865.8.
Teledyne Dalsa "Piranha 4 2K RGB + Mono"; Dec. 11, 2013.
Iwainsky, Alfred, et al. "Lexicon of Computer Graphics and Image Processing"; 1994.

* cited by examiner

*Primary Examiner* — Kristy A Haupt
(74) *Attorney, Agent, or Firm* — Nath, Goldberg & Meyer; Jerald L. Meyer; Stanley N. Protigal

(57) ABSTRACT

A code reader for reading an optical code is provided that has a linear image sensor having a plurality of linear arrangements of light reception pixels for recording image data having the code and a control and evaluation unit that is configured to locate and read the code in the image data, wherein the light reception pixels have a different spectral sensitivity. Here, at least one linear arrangement is a white line whose reception pixels are sensitive to white light for recording a gray scale image and the other linear arrangements are color lines whose reception pixels are sensitive to light of only one respective color for recording a color image.

19 Claims, 2 Drawing Sheets

CODE READER AND METHOD FOR READING OPTICAL CODES

FIELD

The invention relates to a code reader and to a method for reading optical codes.

BACKGROUND

For the automation of logistics applications, for example the automatic sorting of objects, objects are provided with a code that is read by a code reader. Barcodes with corresponding barcode scanners represent a frequent practical application. However, other codes are also used for identification, for instance two-dimensional codes such as a Maxi-Code or an Aztec Code, or texts that are decoded by optical character recognition (OCR). Images of the objects having the codes are recorded to read such codes.

In a reading device working in an automated manner, for instance in baggage handling at airports or in the automated sorting of packages in logistics centers, the objects are conveyed past the code reader and image data of the objects with the codes arranged thereon are acquired by linewise scanning. The individual image lines are assembled using the known or the measured belt speed. Line scan cameras achieve a high resolution and speed.

The line scan cameras typically record a monochrome image that is also called a gray scale image or a black and white image. The best photon yield and therefore the best signal-to-noise ratio are thus achieved and color detection is of no interest for the reading of codes that anyway only have light and dark zones.

If color information should nevertheless be acquired, matrix cameras are made use of as a rule. However, this particularly has disadvantages with fast belt applications since a high frame rate is required and the stitching of its individual frames is very processor intensive in contrast to a simple arrangement of image lines next to one another in rows. In addition, a matrix image sensor cannot reach the same pixel number in the line direction as a linear image sensor.

The most widespread manner of forming a matrix image sensor for color acquisition is the pixelwise provision of respectively two green filters, one red filter, and one blue filter in a Bayer pattern. There are, however, also alternative color patters that, for example, add a white channel (RGBW) or that use subtractive primary colors, for instance red, yellow, and blue (RYBY).

Color line scan cameras are also known. They have, for example, three lines in red, green, and blue (RGB), an alternating arrangement of these primary colors on a single line, or in imitation of the Bayer pattern, a line having alternating red and blue pixels and a second, purely green line.

It is disadvantageous with all of these color image sensors that received light is lost due to the color filters and a black and white image therefore remains superior for the code reading. The color information can therefore only be acquired at the cost of a worse performance during code reading.

DE 10 2015 116 568 A1 discloses a color detection by the combination of a monochrome camera with a tunable color filter. This would not solve the problem because light is still lost in every single color setting and ultimately at best said solutions having line scan cameras of a plurality of lines are emulated for different colors.

A dual line scan camera is described in EP 3 012 778 A2 that is operated with multispectral illumination. This is effectively also nothing else than a color filter that is now generated at a different point, but that does not prevent the light loss for code reading.

SUMMARY

It is therefore the object of the invention to improve the reading of codes with a line scan camera.

This object is satisfied by a code reader and by a method for reading optical codes in accordance with the respective independent claim. The code reader comprises a linear image sensor having a plurality of linear arrangements of light reception pixels. A plurality of linear arrangements means a small number, at least smaller than ten; the resolution in the linear direction and thus the number of light reception pixels in the linear direction is orders of magnitude higher and amounts to several hundreds, thousands, or more. The code reader is therefore configured as a line scan camera. A control and evaluation unit reads the image data, locates code zones therein, and reads their code information. The light reception pixels have different spectral sensitivities, in particular due to color filters or the omission thereof.

The invention starts from the basic idea of forming at least one linear arrangement as a white line to record a gray scale image or a black and white image. Its light reception pixels are sensitive to white light, which is intended to mean that they perceive the whole optical spectrum and do not, for example, have any color filters. The unavoidable hardware limitations of the camera pixels used naturally form the limit of the received light. The remaining linear arrangements are color lines for the recording of a color image whose reception pixels are only sensitive to one respective color. The distribution of the colors within the at least one color liner can be the same or can be a pattern; this will differ depending on the embodiment. In principle, white pixels could be interspersed again into a color line; however, the white line per se is responsible for such image information.

The invention has the advantage that a gray scale image or a black and white image is detected in full resolution at high contrasts and with the best possible signal-to-noise ratio with the at least one white line. At the same time, a piece of color information is acquired that can be used for different additional evaluations using the color line or the color lines, under certain circumstances in interaction with the white line. This additional color detection does not come at the cost of the resolution or of the signal-to-noise ratio thanks to the white line.

The control and evaluation unit assembles image lines preferably recorded after one another during a relative movement between the code reader and the code to form an overall image. With barcodes, a code reading from a single linear recording is alternatively conceivable, but barcodes are preferably also read from such an assembled areal overall image.

The control and evaluation unit is preferably configured to use the gray scale image of the white line to read the codes. The gray scale image has the full resolution and the best possible signal-to-noise ratio so that code reading is possible at the same quality as with a conventional monochrome line scan camera. At the same time, color information is delivered without impairing the decoding result. This color information can be used for any direct functions, but also for functions associated with the code reading, for example an initial segmentation or location of code zones.

The control and evaluation unit is preferably configured to generate the gray scale image and a color image. Both images are thus available for the decoding or other functions.

Two, three, or four linear arrangements are preferably provided of which one or two linear arrangements are white lines. Said numbers are here exact indications, not minimum indications. A particularly compact design of the image sensor is achieved with a few linear arrangements. The minimal embodiment is a dual line having one white line and one color line. To achieve a higher resolution of the color image in the line direction, at least two color lines are preferably provided.

The color lines preferably have light reception pixels that are sensitive to a respective one of two primary colors and no light reception pixels that are sensitive to the third primary color. Primary colors are the additive primary colors red, green, and blur or the subtractive primary colors cyan, magenta, and yellow. Light reception pixels and linear arrangements are saved in that only two of the former are provided. It would alternatively be conceivable that all three respective primary colors are present (RGBW, CMYW).

The control and evaluation unit is preferably configured to reconstruct the third primary color from the two primary colors with the aid of the white line. The white line records a superposition of all the primary colors so that the third primary color can be isolated when the two other primary colors are recorded.

The two primary colors are preferably red and blue. The recording of additive primary colors results in better results. Particularly the green provided twice in the Bayer pattern is not recorded in this preferred embodiment so that no light reception pixels and linear arrangements have to be provided for this purpose. If required, green is generated from the white line and the red and blue color information.

The light reception pixels within a color line are preferably sensitive to the same color. In other words, the whole color line is uniform, for example a red line or a blue line. The corresponding color information is thus detected in full resolution. The light reception pixels within a color line can also be sensitive to different colors, in particular in an alternating order such as red-blue-red-blue. It is further conceivable to combine uniformly color lines and mixed color lines with one another.

The control and evaluation unit is preferably configured for a color correction in which the signals of the light reception pixels contributing to the color image are differently weighted according to the color. A color recording is thereby achieved that is as faithful as possible and that can moreover take account of spectral properties of the illumination or of the environmental light. In this special relationship, the image information detected with the white line is also considered a color, that is it is likewise weighted if the white line is also used for the acquisition of the color information.

The weighting is preferably set by different amplification factors of the linear arrangements. It is particularly advantageous for this purpose if uniform color lines are provided, for example a red line and a blue line. The respective weighting can then be set by a single common amplification factor for the entire linear arrangement and can in particular already be set at the hardware level. This would be conceivable, for example, with a Bayer pattern only by individual amplification factors for the respective pixels with a huge circuitry effort.

Alternatively, the weighting is set by post-processing. Corresponding weighting factors are, for example, calibrated and combined in a matrix for this purpose. It is also conceivable to train a neural network with the measured values of the light reception pixels of the different colors and the actual colors that are known, for example, as reference patterns or via a further color-calibrated sensor and then to use them for the color correction in operation.

The control and evaluation unit is preferably configured to recognize, classify, and/or distinguish from the image background code-bearing objects and/or code zones with reference to the color image. These are some examples for the use of the color image to assist the code reading. The substrate of the code frequently differs in color from the environment or the color information can be used to recognize a code-bearing object and to separate it from the background. Alternatively, the color image is used for some other function, is in particular output as such and only used subsequently, either for visualization functions and diagnostic functions or completely different additional work. The code reader in accordance with the invention combines the two functions of recording a gray scale image particularly suitable for code reading and of a color image usable for supporting or other purposes in a device, with the primary function of code reading not being impaired by the additional color image recording.

The color image preferably has a smaller resolution than the gray image. The high resolution gray scale image of the white line is already available for the code reading. The smaller resolution can already originally be produced by fewer or larger light reception pixels of a respective color in the line direction. Alternatively, a binning or downsampling takes place at the hardware level or software level.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
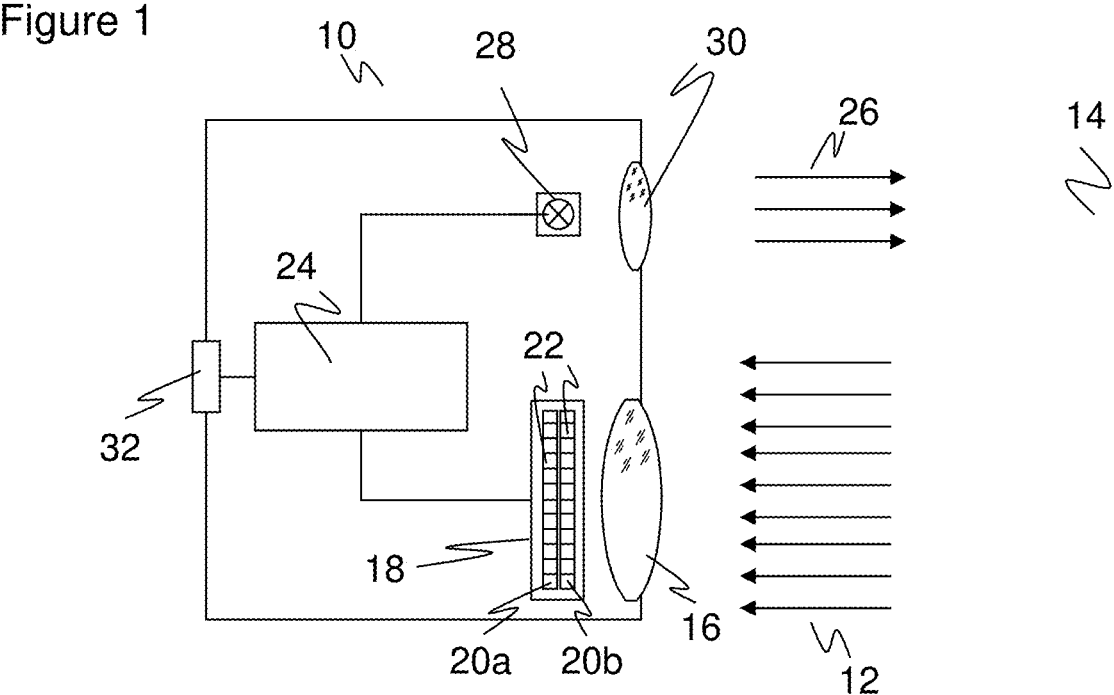
FIG. 1 a schematic sectional representation of a code reader.

FIG. 1 shows a simplified block diagram of a code reader 10. The code reader 10 detects received light 12 from a detection zone 14 through a taking objective 16 that is here only represented by a simple lens. A linear image sensor 18 generates image data of the detection zone 14 and of the objects and code zones that may be present there. The image sensor 18 has at least two lines 20a-b of light sensitive reception pixels 22, with a plurality of hundreds, thousands, or even more reception pixels 22 being provided in the line direction.

The image data of the image sensor 18 are read by a control and evaluation unit 24. The control and evaluation unit 24 is implemented on one or more digital modules, for example microprocessors, ASICs, FPGAs or the like which may also be provided fully or partly outside the code reader 10. A preferred portion of the evaluation comprises arranging detected image lines next to one another in rows to form an overall image. Otherwise, the image data can be preparatorily filtered, smoothed, brightness normalized, tailored to specific zones, or binarized in the evaluation. A segmentation then typically takes place in which individual objects and code zones are located. The codes in these code zones are then decoded, that is the information contained in the codes is read.

To illuminate the detection zone 14 sufficiently brightly with transmitted light 26, an illumination device 28 having a transmission optics 30 is provided that can also be external, differing from the representation. Data can be read at an interface 32 of the code reader 10, and indeed both read code information and other data in different processing stages such as raw image data, preprocessed image data, identified objects, or not yet decoded code image data. It is conversely possible to parameterize the code reader 10 via the interface 32 or via a further interface.

Figure 2:
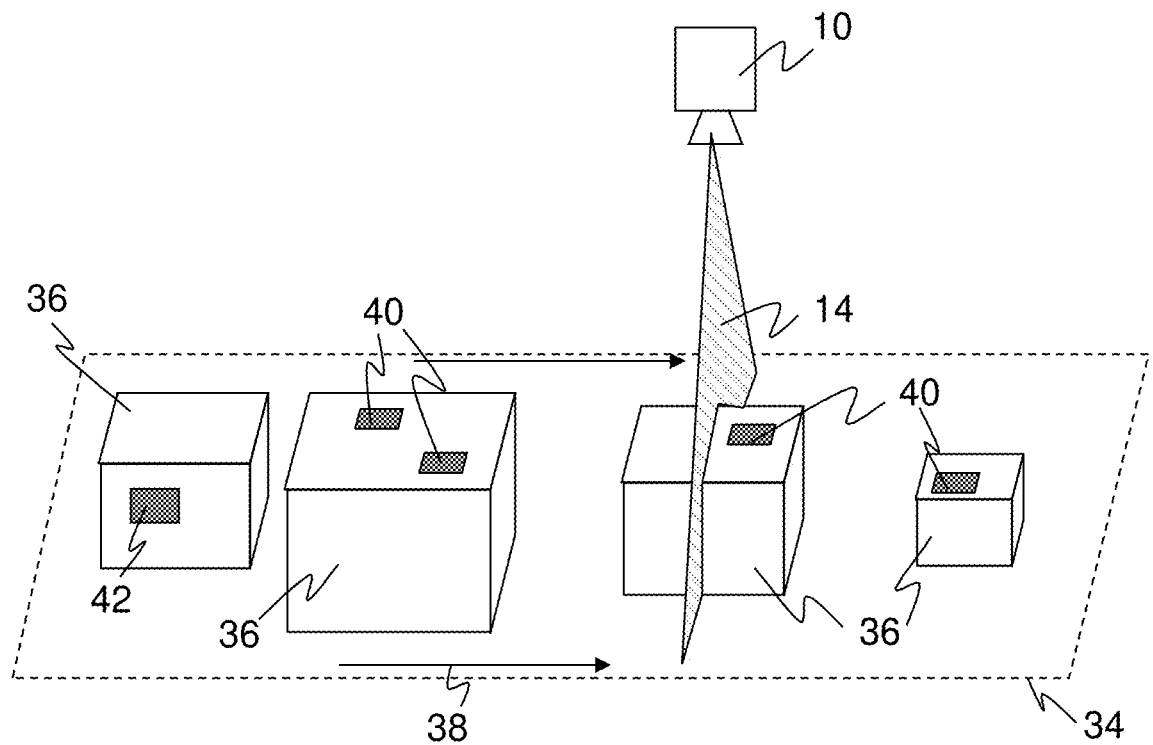
FIG. 2 a three-dimensional view of an application of the code reader in a fixed installation above a conveyor belt having code-bearing objects.

FIG. 2 shows a possible application of the code reader 10 in an installation at a conveyor belt 34 that conveys objects 36 in a conveying direction 38, as indicated by the arrow, through the detection zone 14 of the code reader 10. The objects 36 can bear code zones 40 at their outer surfaces. It is the object of the code reader 10 to recognize code zones 40 and to read the codes affixed there, to decode them, and to associate them with the respective associated object 36. In order also to recognize laterally applied code zones 42, a plurality of code readers 10 are preferably used from different perspectives. There can be additional sensors, for example a laser scanner disposed upstream to detect the geometry of the objects 36 or an incremental encoder for detecting the speed of the conveyor belt 34.

The detection zone 14 of the code reader 10, corresponding to the linear image sensor 18, is a plane having a linear reading field. An overall image of the objects 36 conveyed past, together with the code zones 40, arises gradually in that the objects 36 are taken line-wise in the conveying direction 38. The lines 22a-b are here so close together that they practically detect the same object section. Alternatively, an offset could also be compensated by calculation.

With an image sensor 18, the code reader 10, on the one hand, detects a gray scale image or a black and white image that is used for the code reading. In addition, a piece of color information or a color image is also additionally acquired. The piece of color information can be used for a plurality of additional functions. One example is the classification of objects 36, for instance to determine whether it is a package, an envelope, or a bag. It can be determined whether a convey belt container is empty, such as a tray of a tray conveyor or a box. The segmentation of the image data into objects 36 or code zones 40 can be carried out using or supported by the piece of color information. Additional image recognition work can be done such as the recognition of specific prints or labels, for example for hazardous goods marking, or texts (optical character recognition, OCR).

FIGS. 3 to 6 show some examples of embodiments of the image sensor 18 for such a detection of black and white images and color information. It is common to these embodiments that at least one of the lines 20a-d is a white line whose reception pixels 22 detect light over the total spectrum within the limits of the hardware. At least one further line 20a-d is a color line whose reception pixels 22 are only sensitive to a specific color, in particular by corresponding color filters. The distribution of the colors over the respective reception pixels 22 of the color lines differs in dependence on the embodiment, but differs from the typical RGB and in particular from a Bayer pattern.

Figure 3:
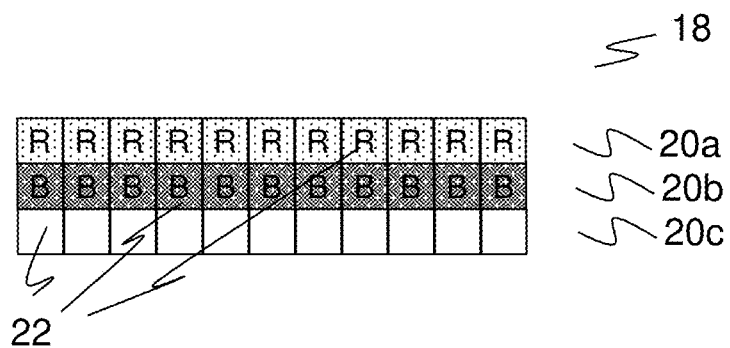
FIG. 3 a schematic representation of a linear image sensor having one red, one blue, and one white line.
Figure 4:
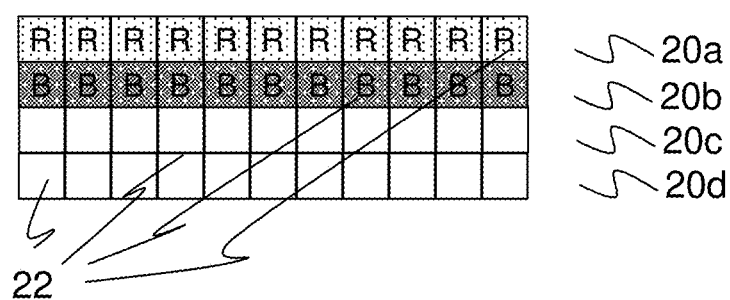
FIG. 4 a schematic representation of a linear image sensor having one red, one blue, and two white lines.

FIG. 3 shows an embodiment having a respective red line 20a, a blue line 20b, and a white line 20c. The lines 20a-c are therefore homogeneous in themselves and the reception pixels 22 within a line 20a-c are sensitive to the same optical spectrum. FIG. 4 shows a variant having an additional white line 20d.

Figure 5:
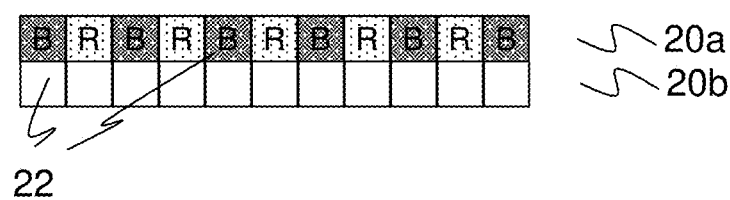
FIG. 5 a schematic representation of a linear image sensor having one alternatingly red-blue line, and one white line.
Figure 6:
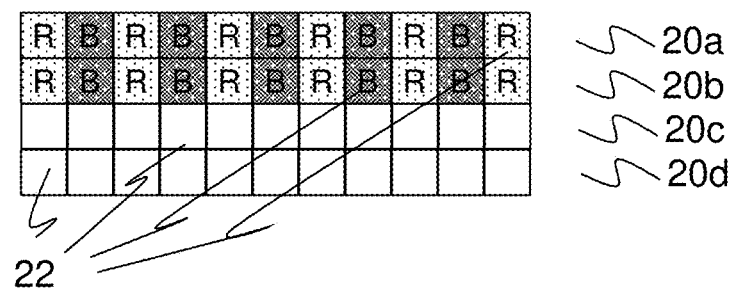
FIG. 6 a schematic representation of a linear image sensor having two alternating red-blue lines, and two white lines.

In the embodiment in accordance with FIG. 5, reception pixels 22 sensitive to red and to blue are alternatingly mixed within a color line 20a. A design having a total of only two lines is thereby possible in combination with one white line 20b. FIG. 6b shows a variant in which both the color lines 20a-b and the white line 20c-d are doubled.

These examples are only a selection based on the primary colors red and blue with white (RBW). Further embodiments use different color filters and colors. The use of green with red or blue (RGW, BGW) or all three primary colors (RGBW) would thus also be conceivable. The subtractive primary colors cyan, magenta, and yellow can furthermore also be considered in analog combinations (CMW, CYW, MYW, or CMYW).

The color filters should generally take account of corrections on the pixel level such as fixed pattern noise. A color comparison is possible overall for differences in the color channels that can depend on the specific environment such as the illumination, reading field, and reading distance. This is possible, for example, by a color correction matrix $R'x1x2x3R$ $G'=(x4x5x6)*G$ $B'x7x8x9B$ whose coefficients are determined by a color calibration. The correction matrix is indicated for RGB, with R and B, for example, being able to be measured and G being able to be reconstructed from W-R-B. Corresponding correction matrices are possible for the other color combinations indicated above.

Alternatively or additionally, a neural network, in particular having a plurality of hidden levels, is used. A red or pre-corrected color vector is predefined as the input and the neural network returns a corrected color vector. Algorithms or neural networks can additionally be used to improve the signal-to-noise ratio by taking account of the color values of the adjacent pixels.

In the embodiments of FIGS. 3 to 6, determination is first only made in the two primary colors red and blue. If a representation of the color in RGB values is desired, the missing color green can be at least approximately reconstructed by G=W-R-B or generally by a function f(W, R, B). A comparison between the different input channels red, blue, and white should be made for this purpose. This is above all required when the color lines are intentionally operated at a higher amplification to limit the effects of the photon yield that is smaller in comparison with the white line.

Whereas the high resolution of the white line is desired for the code reading, the color information is only required in a smaller resolutions in a number of cases. A certain resolution loss in the color lines as in FIG. 5 is therefore not disturbing at all under certain circumstances. It is even conceivable in some cases to artificially reduce the resolution by the merging of pixels (binning, downsampling) and thus to improve the signal-to-noise ratio.

The invention claimed is:

1. A code reader for reading an optical code, the code reader comprising:
   a linear image sensor having a plurality of linear arrangements of light reception pixels for recording image data having the code; and
   a control and evaluation unit that is configured to locate and read the code in the image data, wherein the light reception pixels have a different spectral sensitivity,
   wherein at least one linear arrangement is a white line whose reception pixels are sensitive to white light for recording a gray scale image,
   wherein the other linear arrangements are color lines whose reception pixels are sensitive to light of only one respective color for recording a color image,
   and wherein the color lines have light reception pixels that are sensitive to a respective one of two primary colors and no light reception pixels that are sensitive to the third primary color.

2. The code reader in accordance with claim 1, wherein the control and evaluation unit is configured to use the gray scale image of the white line to read the codes.

3. The code reader in accordance with claim 1, wherein the control and evaluation unit is configured to generate the gray scale image and a color image.

4. The code reader in accordance with claim 1, wherein two, three, or four linear arrangements are provided of which one or two linear arrangements are white lines.

5. The code reader in accordance with claim 1, wherein the control and evaluation unit is configured to reconstruct the third primary color from the two primary colors with the aid of the white line.

6. The code reader in accordance with claim 1, wherein the two primary colors are red and blue.

7. The code reader in accordance with claim 1, wherein the light reception pixels are sensitive to the same color within a color line.

8. The code reader in accordance with claim 1, wherein the light reception pixels are sensitive to different colors within a color line.

9. The code reader in accordance with claim 8, wherein the light reception pixels are sensitive to different colors in an alternating order.

10. The code reader in accordance with claim 1, wherein the control and evaluation unit is configured for a color correction in which the signals of the light reception pixels contributing to the color image are differently weighted according to the color.

11. The code reader in accordance with claim 10, wherein the weighting is set by different amplification factors of the linear arrangements and/or by post-processing.

12. The code reader in accordance with claim 11, wherein the weighting is set in a neural network.

13. The code reader in accordance with claim 1, wherein the control and evaluation unit is configured to recognize, classify, and/or distinguish from the image background code-bearing objects and/or code zones with reference to the color image.

14. The code reader in accordance with claim 1, wherein the color image has a smaller resolution than the gray image.

15. A method of reading an optical code in which image data having the code having a plurality of linear arrangements are recorded linewise by light reception pixels and the code is located and read in the image data, with the light reception pixels detecting image data in different spectral ranges,
   wherein an image line is respectively recorded with at least one white line and at least one color line, with a white line being a linear arrangement whose light reception pixels record white light, and with a color line being a linear arrangement whose light reception pixels record light of only one respective color,
   and wherein the color line has light reception pixels that are sensitive to a respective one of two primary colors and no light reception pixels that are sensitive to the third primary color.

16. The method of claim 15, wherein the weighting is set by different amplification factors of the linear arrangements and/or by post-processing.

17. The method of claim 16, wherein the weighting is set in a neural network.

18. A code reader for reading an optical code, the code reader comprising:
   a linear image sensor having a plurality of linear arrangements of light reception pixels for recording image data having the code; and
   a control and evaluation unit that is configured to locate and read the code in the image data, wherein the light reception pixels have a different spectral sensitivity,
   wherein at least one linear arrangement is a white line whose reception pixels are sensitive to white light for recording a gray scale image,
   wherein the other linear arrangements are color lines whose reception pixels are sensitive to light of only one respective color for recording a color image,
   and wherein the weighting is set by different amplification factors of the linear arrangements and/or by post-processing.

19. The code reader in accordance with claim 18, wherein the weighting is set in a neural network.

* * * * *